(No Model.) 2 Sheets—Sheet 2.
E. B. & A. R. ANDERSON.
DINNER PAIL.
No. 501,313. Patented July 11, 1893.
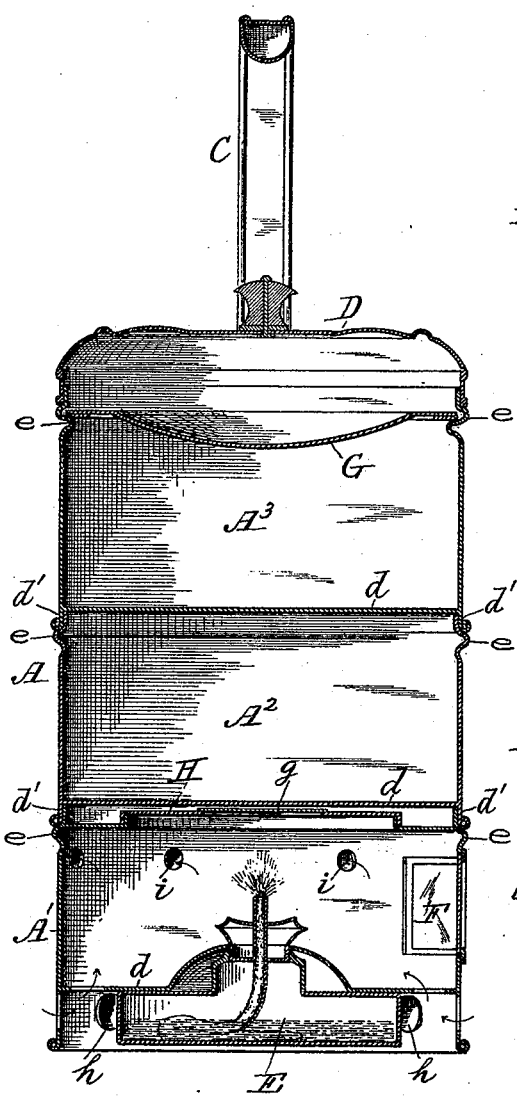
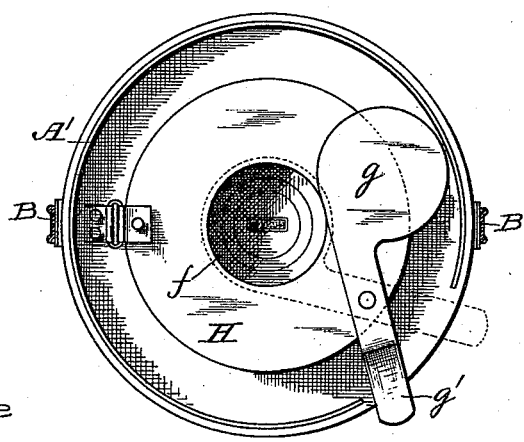
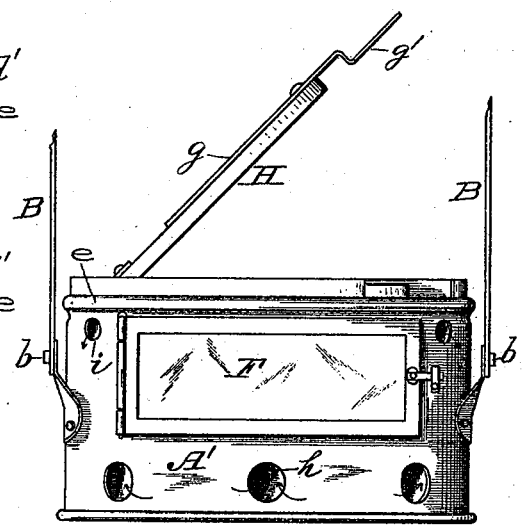
Witnesses:
W. B. Nourse,
Fred E. Buss.
Inventors:
Elias B. Anderson,
Axel R. Anderson,
By A. A. Barker, Att'y

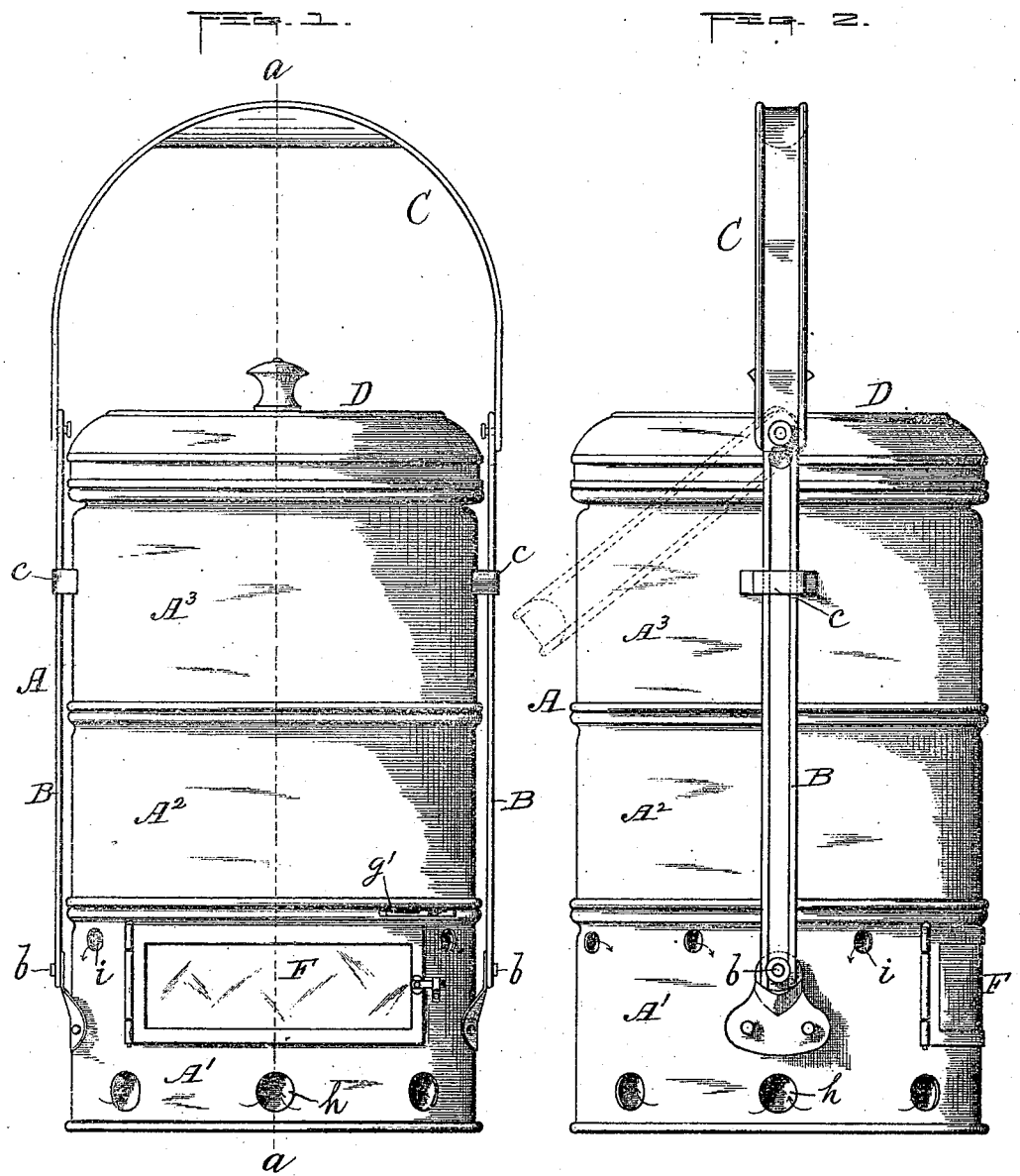

UNITED STATES PATENT OFFICE.

ELIAS B. ANDERSON AND AXEL R. ANDERSON, OF WORCESTER, MASSACHUSETTS.

DINNER-PAIL.

SPECIFICATION forming part of Letters Patent No. 501,313, dated July 11, 1893.

Application filed October 28, 1892. Serial No. 450,235. (No model.)

*To all whom it may concern:*

Be it known that we, ELIAS B. ANDERSON and AXEL R. ANDERSON, both of the city and county of Worcester and State of Massachusetts, have invented certain new and useful Improvements in Dinner-Pails; and we do hereby declare that the following is a full, clear, and exact description thereof, reference being had to the accompanying drawings, forming a part of this specification, and in which—

Figures 1 and 2 represent a front and side view respectively, of a tin dinner pail embodying our improvements. Fig. 3 is a central, vertical section therethrough, taken on line $a\ a$, Fig. 1, and Figs. 4 and 5 represent a plan and side view of the bottom section or compartment of the pail, showing some of the principal features of our improvements which will be hereinafter described.

Our invention relates to tin dinner pails having a lamp or heater in the bottom thereof, and consists of certain improvements in the construction which will be hereinafter more fully set forth.

In order that others may better understand the nature and purpose of our said invention, we will now proceed to describe it more in detail, with reference to the accompanying drawings.

The pail proper, A, is divided into three detachable sections or compartments, $A'$, $A^2$ and $A^3$, and to opposite sides of the lower section, $A'$, are pivoted at $b\ b$ the vertical arms B, B, which extend up through suitable holding loops $c\ c$ on the upper section $A^3$ and are detachably pivoted at their upper ends to the handle C whereby the pail is carried.

D is the removable cover of the pail, which is fitted over said upper section $A^3$.

In the drawings we have shown the holding loops $c$ only on the upper section $A^3$; but, if desired, they may also be used on the middle or any other sections or compartments with which the pail may be provided.

The lower section $A'$ serves, in practice, as a combined heater and lantern, being provided with a lamp E, and with a hinged, glazed door F, preferably on the front side of the pail. The middle section $A^2$, directly over said lamp or heater, is intended for holding coffee, tea, or other liquid, and the upper section, $A^3$ for containing the food of the workman. Said upper section is preferably provided with a removable plate or internal cover G, just below cover D, upon which may be placed a piece of pie, dish of sauce, or other food liable to injury or mixture with the food in the bottom part of the compartment. We reserve the right to use said plate or not, as desired. Each section is, of course, provided with a bottom $d$; and with a flange $d'$ which may be fitted over the upper edge of the section coming next under the same, as is shown in Fig. 3, a horizontal rim or projection $e$ being preferably formed on each section near its upper edge, for the flange above to fit against, and also to strengthen and improve the external appearance of the pail.

The bottom section or compartment covers, as before stated, the principal features of our invention. The employment of a lamp or heater therein, in a broad sense, we do not claim as new, being aware of numerous United States patents embodying such a feature in various forms. The employment of a door, as F, provided with a glass panel, or glass in the sides, to permit light from the lamp to pass out and serve as a lantern, we do, however, believe to be new when combined with a dinner pail. It is also thought to be new to provide the top of the bottom section with a hinged cover H, over the lamp having a central opening $f$ over the flame of said lamp, which may be closed when desired by a slide or damper $g$, as is shown in Figs. 4 and 5 of the drawings.

The purpose of the cover H is to provide a means of reaching the lamp from above, and of the slide or damper, to regulate the heat to the bottom of the liquid compartment. As, for instance, when it is desired to warm the coffee or other liquid contained therein, the damper is moved to one side of the opening $f$, as is shown by full lines in Fig. 4, but when the compartment is empty, and the device is used after dark as a lantern, the damper is closed over the opening, as is shown by dotted lines in said Fig. 4; thereby protecting the bottom of said compartment from the intense heat produced by the lamp, and obviating the liability of its injury and consequent leakage by unduly heating the same, and melting the solder at the joints. Said slide or damper $g$ is preferably provided with a handle $g'$ extending outside of the pail so that it may be operated without opening or taking apart said pail. The cover H, may be hinged or not, as preferred.

In practice, the opening $f$ is designed to be closed at all times except when warming the liquid in compartment $A^2$. Fresh air is supplied to the chamber I in which the burner of the lamp is located, through suitable openings $h$, near the bottom, and the products of combustion pass out above, through the openings $i$, as is shown by the arrows in the various figures.

The lamp may be attached to the bottom of the pail in any suitable manner, and any lamp or heater adapted therefor may be used.

We also reserve the right to employ any suitable device for closing the opening $f$ in the top of the compartment $A'$. The oil reservoir of lamp E is, in this instance, located under the bottom $d$ of said compartment, and its burner is screwed thereto by passing it down through an opening in said bottom, as is shown in Fig. 3.

The lamp may be regulated as usual by opening the door F. Although we have shown only one door in the side of the bottom compartment, it will be understood that we do not limit ourselves thereto. By thus combining a lamp with a dinner pail, as described, which may be used for lighting as well as heating, a workman may quickly and conveniently heat his dinner at noon, as well as amply light his way in returning home after dark, during the short days of the year, or at such other times as he may require the use of a lantern.

We are aware that a combined dinner pail, heater and lantern is not broadly new several devices of this kind having been already patented and we therefore limit our invention to substantially the construction and arrangement herein set forth.

Having now described our invention, what we claim therein as new, and desire to secure by Letters Patent, is—

1. A combined dinner pail, heater and lantern, comprising in combination the following elements; the bottom compartment $A'$ having a central opening and damper at the top, suitable inlet and outlet openings and glass at the sides; a lamp attached to the bottom of said compartment with its burner inside thereof; the liquid compartment $A^2$ next above said compartment $A'$; the food compartment $A^3$, next above said liquid compartment; the cover D, over the food compartment, said compartments and cover all fitting together at the edges; the upright arms B, B, pivoted to the bottom compartment, and properly held in position laterally, and the handle C detachably connected at the ends, with the upper ends of said arms, substantially as and for the purpose set forth.

2. In a combined dinner pail and heater, the detachable liquid compartment $A^2$ and the bottom compartment $A'$ having suitable inlet and outlet openings for the fresh air to enter and the products of combustion to pass out, and also with a large opening at the top, in combination with a hinged cover H fitting over said opening and having in turn a smaller central opening therein; the damper $g$ arranged to cover said central opening in cover H and to be moved to one side thereof, and the lamp E secured in the bottom of said compartment $A'$, substantially as and for the purpose set forth.

3. In a combined dinner pail and heater, the combination of the detachable liquid compartment $A^2$ and the bottom compartment $A'$ having an opening in the top thereof, with the cover H hinged to said top over said opening, and having in turn a central opening therein, and the slide or damper $g$ arranged to cover said central opening in cover H and to be moved to one side thereof, substantially as and for the purpose set forth.

ELIAS B. ANDERSON.
AXEL R. ANDERSON.

Witnesses:
A. A. BARKER,
W. B. NOURSE.